United States Patent [19]

Fukui et al.

[11] Patent Number: 5,337,716
[45] Date of Patent: Aug. 16, 1994

[54] CONTROL APPARATUS FOR INTERNAL COMBUSTION ENGINE

[75] Inventors: Wataru Fukui; Toshio Ohsawa, both of Himeji, Japan

[73] Assignee: Mitsubishi Denki Kabushiki Kaisha, Tokyo, Japan

[21] Appl. No.: 9,673

[22] Filed: Jan. 27, 1993

[30] Foreign Application Priority Data

Feb. 4, 1992 [JP] Japan .................................. 4-019145
Dec. 24, 1992 [JP] Japan .................................. 4-344486

[51] Int. Cl.$^5$ ................................................ F02P 5/14
[52] U.S. Cl. .................................. 123/425; 364/431.08
[58] Field of Search ................ 123/425, 406, 198 DB; 364/431.08; 73/117.3

[56] References Cited

U.S. PATENT DOCUMENTS

| | | | |
|---|---|---|---|
| 4,762,106 | 8/1988 | Blauhut | 123/425 |
| 4,987,771 | 1/1991 | Iwata | 73/117.3 |
| 5,083,278 | 1/1992 | Matsuura | 364/431.08 |
| 5,087,882 | 2/1992 | Iwata | 123/425 |
| 5,088,044 | 2/1992 | Matsuura | 364/431.08 |
| 5,131,368 | 7/1992 | Komurasaki | 123/425 |
| 5,131,369 | 7/1992 | Kanehiro et al. | 123/425 |
| 5,146,893 | 9/1992 | Oshawa | 123/425 |
| 5,153,834 | 10/1992 | Abo et al. | 123/425 |
| 5,168,854 | 12/1992 | Hashimoto et al. | 123/425 |
| 5,189,373 | 2/1993 | Murata et al. | 123/425 |

FOREIGN PATENT DOCUMENTS 4132858 4/1992 Fed. Rep. of Germany.
4204484 8/1992 Fed. Rep. of Germany.

*Primary Examiner*—Raymond A. Nelli
*Attorney, Agent, or Firm*—Sughrue, Mion, Zinn, Macpeak & Seas

[57] ABSTRACT

An engine control apparatus can significantly improve reliability in misfire detection by preventing erroneous detection of the level of an ion current due to noise superposition. An angular position detector generates a reference position signal representative of a predetermined crank angle of each engine cylinder in synchronism with the rotation of an internal combustion engine. Sensors detect an operating state of the engine. An ion current detector detects an ion current in at least one of the engine cylinders. An engine control parameter setter sets a control parameter for the engine in accordance with the reference position signal and the engine operating state. A misfire detector generates a misfire detection signal indicative of occurrence of misfiring in the at least one engine cylinder on the basis of a value of the ion current. The control parameter setter corrects the control parameter on the basis of the misfire detection signal. Alternately, the engine control apparatus may include a window setter for causing the misfire detector to determine misfire only when ignition coil is in a non-energized state.

5 Claims, 5 Drawing Sheets

CONTROL APPARATUS FOR INTERNAL COMBUSTION ENGINE

BACKGROUND OF THE INVENTION

1. Field of the Invention

The present invention relates generally to an engine control apparatus for detecting a misfire on the basis of a detected ion current value and correcting engine control parameters upon detection of misfire. More particularly, the present invention is concerned with an engine control apparatus in which the reliability in misfire detection is improved or enhanced by preventing erroneous detection of the ion current level due to superposition of noise.

2. Description of the Related Art

In general, in an internal combustion engine (hereinafter referred to simply as an engine) driven by a plurality of engine cylinders through a crankshaft, a reference position signal generated in synchronism with the rotation of the engine is utilized for determining a variety of timings for the engine operation controls such as an ignition timing, a fuel injection timing and the like. To this end, an angular position detector for generating a reference position signal is mounted on the crankshaft or a camshaft of the engine at such a position that the reference position signal as generated indicates a predetermined reference position, which corresponds to a predetermined crank angle (i.e., angle of rotation of the crankshaft).

When a misfire occurs in an engine cylinder which is to be controlled in the ignition cycle, being accompanied with no explosion, an abnormal explosion known as after-burning will take place after the ignition cycle, involving injury of the engine cylinder and/or damage of a catalyst employed for catalytic treatment of the exhaust gas due to the contact with an uncombusted gas mixture (i.e., air/fuel mixture undergone no combustion). Under the circumstances, a variety of measures are developed and adopted in an attempt for evading occurrence of misfire in the engine, to thereby secure protection of the engine.

For a better understanding of the background of the present invention, an engine control apparatus will be described in some detail by reference to the drawings.

FIG. 5 is a block diagram showing the general arrangement of the engine control apparatus.

Referring to the figure, a reference numeral 1 denotes an angular position detector which is constituted, for example, by a rotatable disk mounted on a camshaft of the engine for generating a pulse-like reference position signal $T\theta$ corresponding to a predetermined crank angle (reference position) in synchronism with the rotation of the engine. Usually, the reference position is set, for example, at a crank angle or position of 75 degrees (i.e., B75°) or 5 degrees (B5°) before top dead center of each engine cylinder. A set of sensors, collectively designated at reference numeral 2, detect a variety of engine operating parameters such as an intake air flow (or an opening degree of a throttle valve) indicative of an engine load, a rotation speed (rpm) of the engine, an intake air temperature and so forth, and generate corresponding signals D. An ion current detector 20 detects ions generated within the engine cylinder through the explosive combustion. The ion current detector 20 serving for a combustion state detecting function is provided in association with all the engine cylinders or alternatively for a given number of the engine cylinders, respectively, as occasion requires. A control unit in the form of a microcomputer, generally designated at reference numeral 3, includes an engine control parameter setting circuit 31 for arithmetically determining a control parameter Ta for each engine cylinder on the basis of the reference position signal $T\theta$ and the engine operation state signals D mentioned above, and a misfire detecting circuit 32 for generating a misfire detection signal C on the basis of the reference position signal $T\theta$ and the detected ion current value I. The misfire detecting circuit 32 has a comparison function for comparing the detected ion current value I with a reference level *which depends on the engine operation state signal D.

The engine control parameter setting circuit 31 is so designed as to generate, as the engine control parameter Ta, a control timing signal which corresponds, for example, to the ignition timing, and at the same time perform a misfire suppression processing (e.g., increasing of electric energy for the ignition coil of the misfired cylinder) on the basis of the misfire detection signal C generated when the detected ion current value I indicates a misfire level or perform control of stopping fuel injection for the misfired cylinder, to thereby suppress discharge of the uncombusted gas mixture. As the engine control parameter Ta, not only the ignition timing but also other various control parameters such as the fuel injection timing, duration of the power supply to an ignition coil for the misfiring cylinder, etc., can be employed.

FIG. 6 is a circuit diagram showing the structure of the ion current detecting detector 20. As can be seen from this figure, the ion current detector 20 comprises an ignition coil 21 having a primary winding 21a and a secondary winding 21b, a power transistor 22 for breaking a primary current $i_1$ flowing through the primary winding 21a in response to an ignition trigger pulse P generated in an ignition timing sequence, a spark plug 23 for producing a spark through electric discharge brought about by a high voltage induced across the secondary winding 21b, a DC power supply source 24 for discharging, as an ion current i, those ions which are produced by the explosive combustion primed by the spark discharge of the spark plug 23, a resistor 25 connected in series to the DC power supply source 24 for converting the ion current i into a corresponding voltage signal, and an output terminal 26 for outputting the detected ion current value I in the form of the voltage signal mentioned above.

FIG. 7 is a waveform diagram showing a waveform of the ion current i. As can be seen from this figure, the ion current i increases as fire flame grows in succession to the explosion triggered by the spark discharge produced at the ignition plug 23 upon breakage of the primary current $i_1$ in response to the ignition trigger pulse P.

Now, description will turn to the operation of the above-mentioned engine control apparatus shown in FIG. 5 by reference to FIGS. 6 and 7.

Let us consider ignition timing control for example. In this case, the engine control parameter setting circuit 31 sets the ignition timing with reference to the reference position which corresponds to a rising edge or a falling edge of the reference position signal $T\theta$ and determines the ignition timing so as to be optimal for the prevailing engine operation state D by consulting a data map or table, to thereby output as the control parameter Ta a control time or duration extending from the reference position to the ignition time point.

On the other hand, the misfire detecting circuit 32 determines the combustion state within each engine cylinder in each ignition cycle on the basis of the reference position signal T$\theta$ outputted from the angular position detector 1 and the detected ion current value vI outputted from the ion current detector 20 and generates a misfire detection signal C for the engine cylinder for which the detected ion current value I produced in the explosion stroke is lower than a predetermined reference level. The engine control parameter setting circuit 31 corrects, responsive to the misfire detection signal C inputted thereto, the control parameter Ta for the misfiring engine cylinder so that occurrence of misfire in that cylinder is suppressed. To this end, the ignition energy (or duration of the primary current $i_1$ of the ignition coil) may be increased to thereby ensure ignition without fail. Further, in association with the fuel injection control, the injection period may be increased or decreased to enrich or thin the air/fuel mixture to thereby confirm whether misfire can be evaded by changing the air/fuel ratio. In case the misfire susceptibility can not be reduced or suppressed even by the correction of the control parameter Ta as mentioned above, fuel injection to the misfiring engine cylinder is stopped to thereby prevent the discharge of the uncombusted gas.

In general, when the power transistor 22 is turned off in response to an ignition trigger pulse P in an ignition cycle, a high voltage of negative polarity is applied across the electrodes of the spark plug 23 connected to the secondary winding 21b of a corresponding ignition coil 21, as a result of which an electric discharge takes place between the electrodes of that spark plug 23 to fire the gas mixture which then undergoes an explosive combustion. At this time, ions are produced within the engine cylinder due to ionization brought about by the explosive combustion. In that case, one of the electrodes of the spark plug 23 to which a bias voltage is applied from the DC power supply source 24 serves as an electrode for detecting the ion current $\underline{i}$.

The ions produced through the aforementioned ionization within the engine cylinder are caused to migrate under the effect of the electric field of the bias voltage of positive polarity supplied from the DC power source 24, giving rise to a flow of the ion current $\underline{i}$, which is then converted into the detection voltage I by the resistor 25 to be outputted from the output terminal 26. Thus, it is possible to make decision as to whether or not the gas mixture within the cylinder in each ignition cycle has been fired without fail by checking the level of the detected ion current signal I.

Usually, in the level decision of the detected ion current value I, a pulse obtained by shaping a part of waveform of the detected ion current value I which exceeds a threshold level, a peak-hold value, an integrated value or the like of the detected ion current signal I is employed. Further, since the detected ion current value I may vary in dependence on the engine operating state D, the reference level for comparison with the detected ion current value in the misfire decision may be appropriately modified or altered in dependence on the engine operating state D.

In conjunction with the ion current detection, it is however noted that there is a possibility that noise is generated upon driving of the ignition coil and superposed on the ion current I as detected. Consequently, when the ion current value I is retrieved at the timing for driving the ignition coil, the ion current level may undesirably be detected erroneously, leading to erroneous or false detection of misfiring or non-detection of the misfire which has really occurred. It goes without saying that such erroneous detection of the ion current level may result in unnecessary misfire suppression control or missing of the misfire suppression control at the time of occurrence of actual misfiring.

As will now be appreciated from the foregoing, the above-mentioned engine control apparatus in which a misfire detection signal C is generated through comparison of a detected ion current signal with a reference level without taking account of the timing for fetching the detected ion current value I suffers from the following problems. The reliability in misfire detection is degraded due to possible superposition of noise which generated upon driving the ignition coil, so the misfire evading or suppressing control may unnecessarily be performed or the misfire evading control can not be performed at all notwithstanding the fact that misfiring is actually taking place.

SUMMARY OF THE INVENTION

Accordingly, it is an object of the present invention to provide an engine control apparatus in which the reliability of misfire detection is improved or enhanced by preventing erroneous detection of the ion current level due to noise superposition, to thereby solve the aforementioned problems which the above-mentioned engine control apparatus suffers.

In view of the above and other objects which will become more apparent as description proceeds, the present invention is directed to an engine control apparatus which comprises an angular position detector for generating a reference position signal representative of a predetermined crank angle of each cylinder of an internal combustion engine in synchronism with the rotation thereof, sensor means for detecting one of several engine operating parameters and generating a corresponding engine state signal, an ion current detector for detecting an ion current in at least one of the engine cylinders, a misfire detecting circuit for generating a misfire detection signal indicative of occurrence of misfiring in the at least one engine cylinder on the basis of a detected value of the ion current, and an engine control parameter setting circuit for setting a control parameter for the engine on the basis of the reference position signal and the engine operating state signal, the control parameter setting circuit being operable to correct the control parameter on the basis of the misfire detection signal.

In the engine control apparatus described above, it is proposed according to one aspect of the present invention that the misfire detecting circuit comprises a detected value hold means circuit for holding the detected value of the ion current, a detected value reading means circuit for reading the detected value immediately before the start of electrical energization of an ignition coil for the at least one engine cylinder, and a comparison circuit for comparing the detected value thus read with a reference value to thereby generate a misfire detection signal.

With this arrangement, the occurrence or nonoccurrence of misfiring can be detected with high reliability and accuracy because the detected ion current value indicative of the combustion state of the engine is fetched for misfire decision at a time point immediately before the start of electric energization of the ignition coil in which no ignition noise is generated.

According to another aspect of the invention, it is proposed in association with the engine control apparatus described above to provide a window setting means for causing the misfiring detecting circuit to determine misfire only when an ignition coil for the at least one engine cylinder is in a non-energized state.

With this arrangement, occurrence or non-occurrence of misfiring can be detected with high reliability and accuracy because the detected ion current value indicative of the combustion state of the engine is fetched at a time point which does not fall within the ignition coil driving period in which there is a high probability of noise generation.

The invention will become more readily apparent from the following description of preferred or exemplary embodiments thereof shown, by way of example only, in the drawings.

DESCRIPTION OF THE PREFERRED EMBODIMENTS

Now, the invention will be described in detail in conjunction with preferred or exemplary embodiments thereof by reference to the drawings.

Embodiment 1

Figure 1:
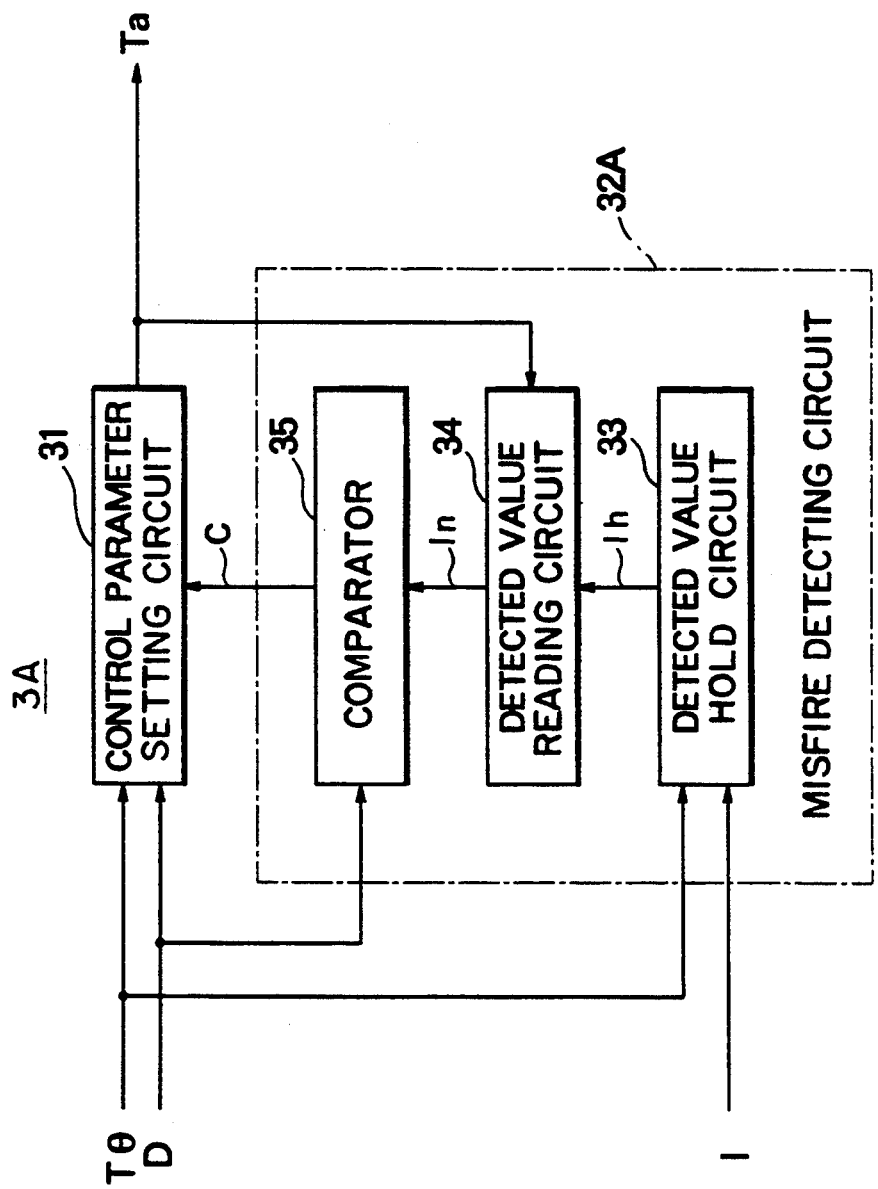
FIG. 1 is a block diagram showing generally the arrangement of an engine control apparatus according to a first embodiment of the present invention.
Figure 5:
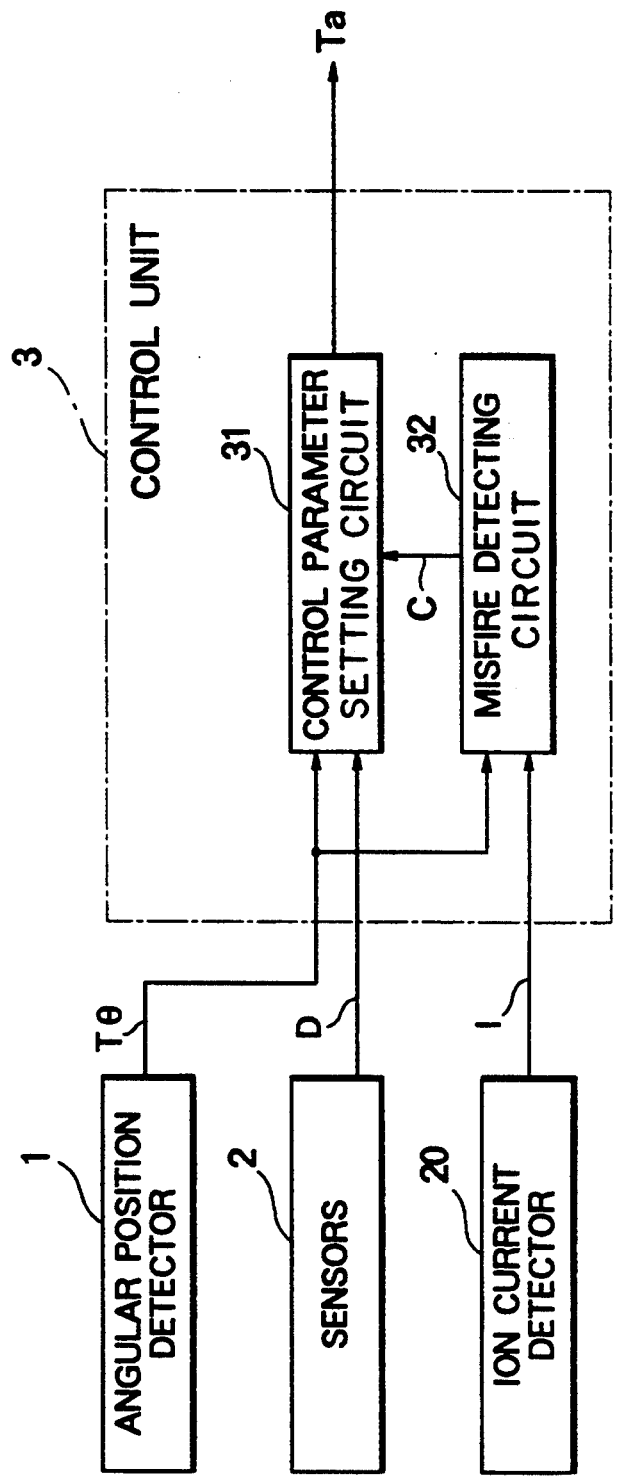
FIG. 5 is a block diagram showing an engine control apparatus relating to the present invention.
Figure 6:
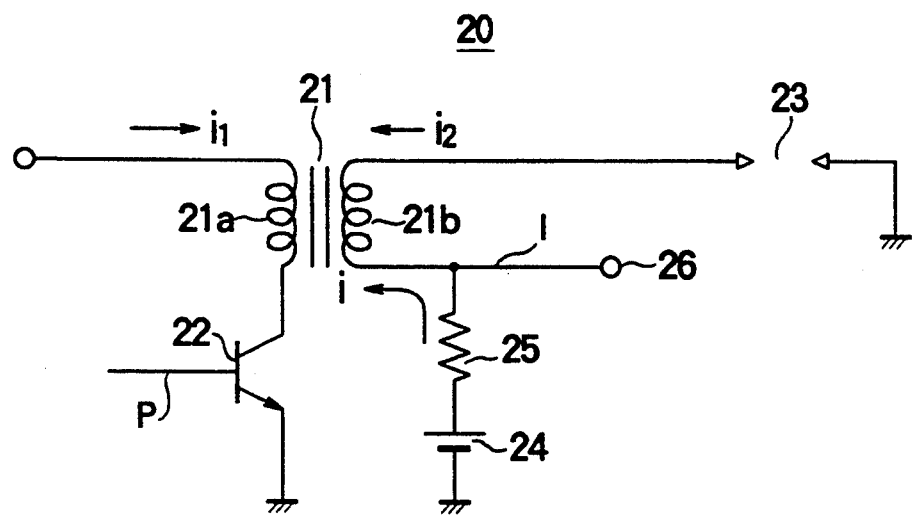
FIG. 6 is a circuit diagram of an ion current detector incorporated in the engine control apparatus of FIG. 5.
Figure 7:
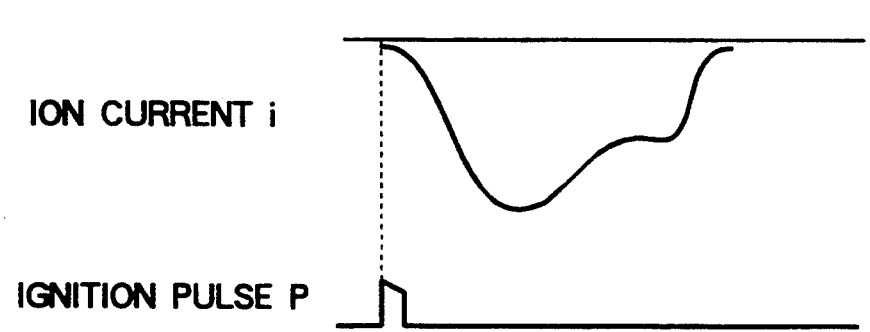
FIG. 7 is a waveform diagram showing a waveform of an ion current detected by the ion current detecting circuit of FIG. 6.

FIG. 1 generally shows in block form the arrangement of an engine control apparatus according to a first embodiment of the present invention. Referring to this figure, reference symbols 3A and 32A denote a control unit and a misfire detector, respectively, which correspond to the control unit 3 and the misfire detector 32, respectively, described hereinbefore by reference to FIG. 5. A reference numeral 31 denotes a control parameter setting circuit which is the same as or similar to the one designated by 31 in FIG. 5. Further, C, T$\theta$, D and I denote signals similar to those described hereinbefore in conjunction with the related art of the invention. Namely, though not illustrated, the engine control apparatus of this invention includes an angular position detector, a variety of engine state sensors and an ion current detector which are the same or similar to those designated by 1, 2 and 20 in FIG. 5, and which generate a reference position signal T$\theta$, an engine operating state signal D and a detected ion current signal I, respectively. Accordingly, repeated description of these components and signals will be unnecessary. Furthermore, the ion current detector 20 may be implemented in the same configuration as that shown in FIG. 6 and described hereinbefore.

A misfire detecting circuit, generally denoted at 32A, includes a detected value hold circuit 33 for holding a detected ion current I as a value Ih, a detected value read circuit 34 for reading the detected ion current Ih as a value In immediately before starting the current supply to the primary winding 21a of the ignition coil 21 (see FIG. 6) for the engine cylinder being monitored, and a comparator 35 for comparing the read value In with a reference level for thereby producing a misfire detection signal C. Parenthetically, the timing for starting the current supply to the ignition coil 21 (i.e., the power supply start timing) is one of the engine control parameters Ta.

Figure 2:
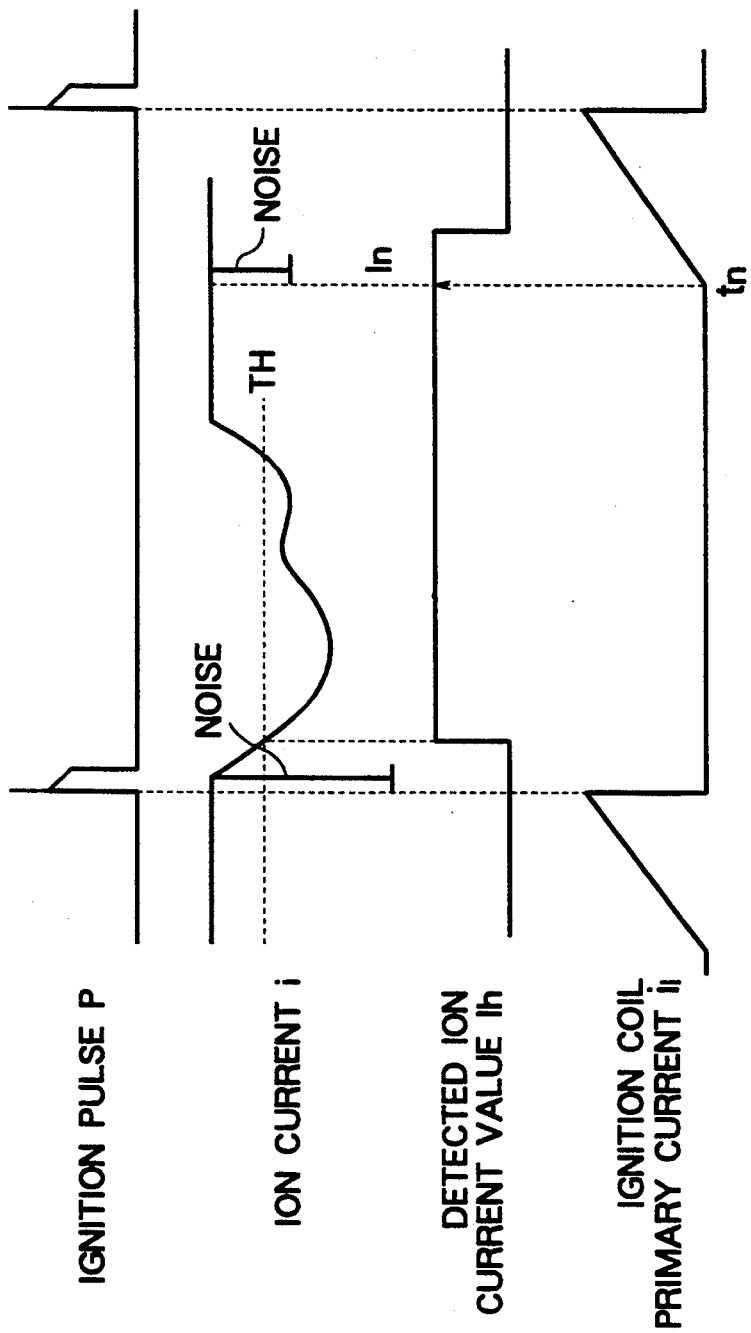
FIG. 2 is a waveform diagram for illustrating the operation of a misfire detector incorporated in the apparatus shown in FIG. 1.

FIG. 2 is a waveform diagram for explaining the operation of the misfire detector 32A and shows waveforms of a primary current $i_1$ applied to the primary winding 21a of the ignition coil 21 for electrical energization thereof, an ignition trigger pulse P for turning off a power transistor 22 (FIG. 6) to thereby break the primary current $i_1$ an ion current i, a detection value Th resulting from the level comparison of the ion current with a threshold value TH, and a detection value In fetched at a time point tn immediately before starting the electric energization of the ignition coil.

The detection value Ih representing the detected ion current is obtained by converting the detected ion current i into a pulse through comparison thereof with the threshold value TH and by shaping the thus converted pulse by a low-pass filter for eliminating frequency components higher than a predetermined frequency (e.g., 1 KHz). The reason for eliminating the high frequency components by the low-pass filter upon pulse shaping is to suppress erroneous or false output due to superposition of electrical noise generated upon ignition as well as other spurious noise.

As shown in FIG. 2, noise is superposed on the ion current i at time points when the primary current $i_1$ is applied and broken, respectively. As can be seen in the figure, the noise level is higher at the time point when the coil current is broken than at the time point corresponding to the start of conduction of the primary current.

Parenthetically, the low-pass filter function is incorporated in the detected value hold circuit 33, and the detected ion current value Ih is held by a flip-flop or a latch constituting a part of the detected value hold circuit 33.

Now, description will turn to the operation of the engine control apparatus according to the instant embodiment of the invention by referring to FIG. 2 together with FIG. 1.

Usually, the control time duration Ta is arithmetically determined by the control parameter setting means 31 on the basis of the reference position signal T$\theta$ and the engine operation state D, as described hereinbefore, and corrected by the control parameter setting device 31 in response to the input of the misfire detection signal C.

On the other hand, the detection value hold means 33 incorporated in the misfire detector 32a holds the pulse which has turned into a high level "H" when the ion current i exceeded the threshold level TH, as the detected ion current value Ih which is to be outputted by way of the low-pass filter, while the detected value read circuit 34 fetches the detected ion current value In which is held by the detected value hold circuit 33 in a preceding combustion cycle at a time point tn immediately before the start of the electrical energization or power supply to the ignition coil 21 for a succeeding combustion stroke of the cylinder of concern.

Since the timing tn for reading or fetching the detected ion current value In substantially coincides with the timing for starting the power supply to the ignition coil, there is no need for setting the timing tn separately.

Further, at the time point tn immediately before the start of the electrical energization or power supply to the ignition coil, no noise can be generated. Accordingly, the problem of noise superposition on the detected ion current value In as fetched can be evaded. After reading of the detected current value In, is performed the detected value hold circuit 33 is reset.

The detected current value In as fetched is compared with the reference level by the comparator 35. When the detected value In is smaller than the reference level, then decision is made that the misfire event has taken place during the preceding combustion stroke, as a result of which a misfire detection signal C is generated.

In response to the input of the misfire detection signal C, the control parameter setting circuit 31 corrects the control parameter(s) Ta for the engine cylinder for which occurrence of the misfire was detected so that it can be suppressed. However, unless the misfire cannot nevertheless be prevented, fuel injection to the cylinder suffering the misfire is stopped for thereby preventing discharge of uncombusted gas mixture (i.e., gas undergone no combustion).

As will be seen from the foregoing, the misfire detection signal C can be generated with a high degree of reliability with a simple configuration of decision logic owing to the misfire detection based on the detected ion current value In fetched at a time point tn immediately before the start of energization of the ignition coil.

Although it has been described that the detected ion current In is fetched as a pulse current resulting from the waveform shaping, a peak-hold value or an integrated value of the ion current Ih may be used with substantially the same effect, as described previously. In any case, the detected value hold circuit 33 is set (i.e., the hold function thereof is enabled) after each ignition and reset (i.e., disabled) during a period from the reading of the value held therein to a time point at which it is again set after the following ignition.

Embodiment 2

In the case of the above-described first embodiment, the superposition of noise on the detected ion current value In is evaded by setting the timing for reading the detected ion current value In at the time point tn which immediately precedes to the start of electrical energization (i.e., turn-on) of the ignition coil. According to another aspect of the invention incarnated in the second embodiment, it is proposed to set a window for the detected ion current value I input to the misfire detector 32, to thereby ignore the detected ion current value I during a period in which noise may possibly be superposed on the ion current I.

Figure 3:
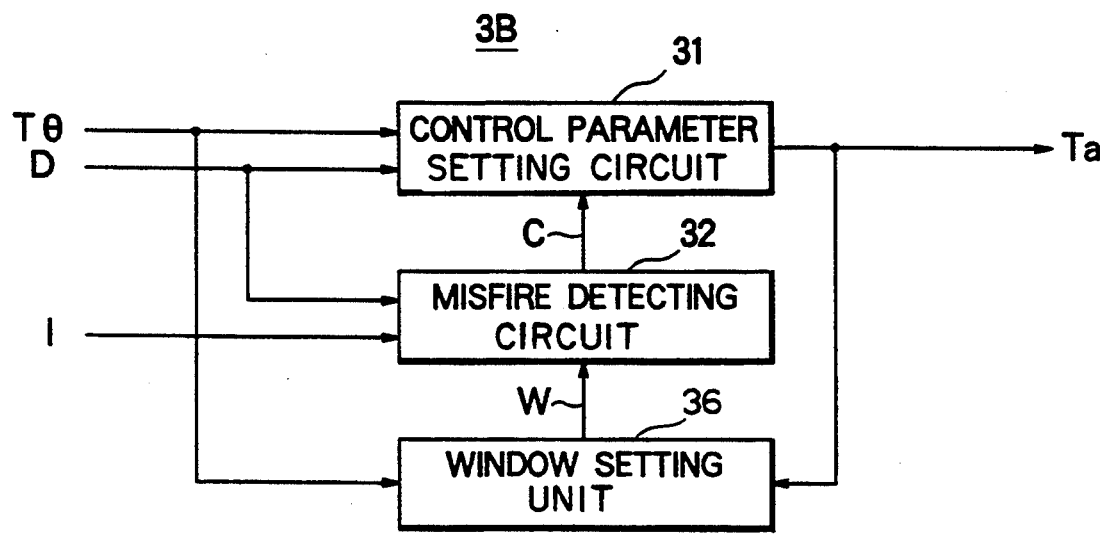
FIG. 3 is a block diagram generally showing the structure of an engine control apparatus according to a second embodiment of the invention.

FIG. 3 is a block diagram showing the arrangement of the engine control apparatus according to the second embodiment of the invention. In this figure, reference symbol 3B denotes a control unit corresponding to the control unit 3A shown in FIG. 1.

The engine control apparatus according to the instant embodiment includes a window setting unit 36 for ignoring the detected ion current value I during a period for driving the ignition coil for the engine cylinder of concern. More specifically, the window setting unit is designed to set a validation period or a window W for the detected ion current value I supplied to the misfire detecting circuit 32 on the basis of the control parameters Ta including the ignition coil driving period, for thereby masking the detected ion current value I for a predetermined period which covers the driving period of the ignition coil 21.

Figure 4:
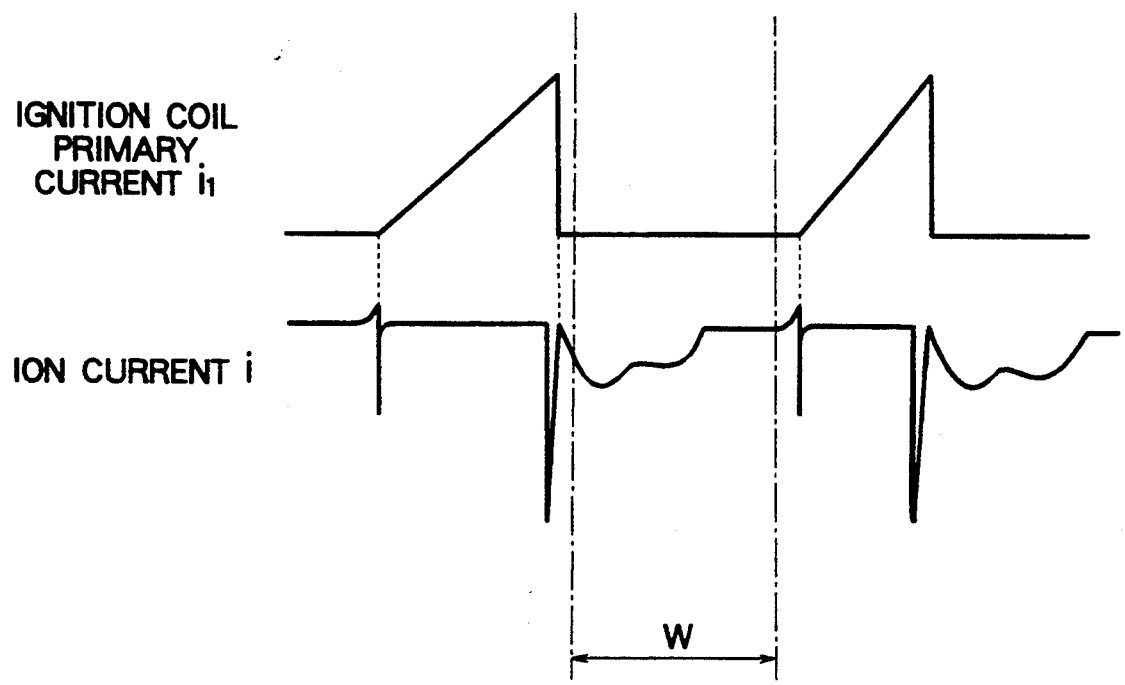
FIG. 4 is a waveform diagram for illustrating the operation of a window setting means incorporated in the apparatus shown in FIG. 3.

FIG. 4 is waveform diagram for illustrating the operation of the window setting means 36 and shows waveforms of a current $i_1$ flowing through the primary winding 21a of the ignition coil 21, an ion current $i$ and a window W, respectively, along a time base.

As can be seen in FIG. 4, noise is superposed on the ion current $i$ at time points for starting energization (turn-on) of the ignition coil and deenergization (turn-off) thereof. Accordingly, the window W is set to mask a predetermined time duration or period which covers the ignition coil driving period.

By reading the detected ion current value I for the misfire decision during the period corresponding to the window W, the misfire detector 32 can generate the misfire detection signal C on the basis of the detected ion current I without being influenced at all by noise. Thus, the reliability of the misfire detection can significantly be enhanced.

It should be noted that the misfire detector 32A including the detected ion current read circuit 34 shown in FIG. 1 may be combined with the window setting unit 36 according to the second embodiment of the invention. In that case, the reliability of the misfire detection can further be increased.

Many features and advantages of the present invention are apparent from the foregoing description and thus it is intended by the appended claims to cover all such features and advantages of the apparatus which fall within the true spirit and scope of the invention. Further, since humerus modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An engine control apparatus comprising:
    an angular position detector for generating a reference position signal representative of a predetermined crank angle of each cylinder of an internal combustion engine in synchronism with the rotation thereof;
    sensor means for detecting one of several engine operating parameters;
    ion current detecting means for detecting an ion current in at least one of said engine cylinders;
    misfire detecting means for generating a misfire detection signal indicative of occurrence of misfiring in said at least one engine cylinder in accordance with a detected value of said ion current; and
    engine control parameter setting means for setting a control parameter for said engine on the basis of said reference position signal and said one of several engine operating parameters and correcting said control parameter in accordance with said misfire detection signal;

said misfire detecting means comprising:

detected value hold means for holding said detected value of said ion current;

detected value reading means for reading said detected value, held in said hold means, immediately before starting electrical energization of an ignition coil for said at least one engine cylinder; and comparison means for comparing said detected value read by said reading means with a reference value to generate said misfire detection signal if said detected value is less than said reference value.

2. An engine control apparatus according to claim 1, wherein said detected value hold means includes a low-pass filter for eliminating frequency components higher than a predetermined frequency.

3. An engine control apparatus comprising:

angular position detecting means for generating a reference position signal representative of a predetermined crank angle of each cylinder of an internal combustion engine in synchronism with the rotation thereof;

sensor means for detecting one of several engine operating parameters;

ion current detecting means for detecting an ion current in at least one of said engine cylinders;

window determining means for determining a period of time during which an ignition coil for said at least one engine cylinder is in a non-energized state;

misfire detection means for determining, only during said period of time, occurrence of misfiring in said at least one engine cylinder in accordance with a detected value of said ion current and generating a misfire detection signal indicative thereof; and engine control parameter setting means for setting a control parameter for said engine on the basis of said reference position signal and said one of several engine operating parameters and correcting said control parameter in accordance with said misfire detection signal 4. An engine control apparatus according to claim 3, wherein said misfire detecting means comprises:

detected value hold means for holding said detected value of said ion current;

detected value reading means for reading said detected ion current value, held in said hold means, immediately before starting electrical energization of said ignition coil; and comparison means for comparing said detected vale read by said reading means with a reference value to thereby generate said misfire detection signal if said detected value is less than said reference value.

5. An engine control apparatus according to claim 3, wherein said window determining means determines said period of time in accordance with said control parameter.

* * * * *